(12) United States Patent
Cohn

(10) Patent No.: US 6,481,382 B2
(45) Date of Patent: Nov. 19, 2002

(54) COLLAR WITH SELF-RETRACTING LEASH

(76) Inventor: Joan S. Cohn, 29851 Ono Blvd., Orange Beach, AL (US) 36561

( * ) Notice: Subject to any disclaimer, the term of this patent is extended or adjusted under 35 U.S.C. 154(b) by 0 days.

(21) Appl. No.: 09/768,893

(22) Filed: Jan. 24, 2001

(65) Prior Publication Data

US 2002/0096128 A1 Jul. 25, 2002

(51) Int. Cl.$^7$ ............................................ B65H 75/34
(52) U.S. Cl. ........................ 119/794; 119/793; 119/856
(58) Field of Search ................................ 119/793, 792, 119/794, 795, 796, 856, 857–865

(56) References Cited

U.S. PATENT DOCUMENTS

| | | | |
|---|---|---|---|
| 2,799,245 A | | 7/1957 | Ruggiero |
| 3,250,253 A | | 5/1966 | Galin |
| 3,776,198 A | * | 12/1973 | Gehrke ........................ 119/794 |
| 4,018,189 A | | 4/1977 | Umphries |
| 4,020,795 A | * | 5/1977 | Marks ........................ 119/654 |
| 4,197,817 A | | 4/1980 | Crutchfield |
| 4,328,766 A | | 5/1982 | Deibert |
| 4,328,767 A | | 5/1982 | Peterson |
| 4,964,370 A | | 10/1990 | Peterson |
| 4,977,860 A | | 12/1990 | Harwell |
| 5,595,143 A | * | 1/1997 | Alberti ........................ 119/794 |
| 5,816,198 A | | 10/1998 | Peterson |
| 6,125,793 A | * | 10/2000 | Petty ........................ 119/792 |
| 6,374,779 B1 | * | 4/2002 | Miller ........................ 119/863 |

* cited by examiner

Primary Examiner—Charles T. Jordan
Assistant Examiner—Judith A. Nelson
(74) Attorney, Agent, or Firm—Chambliss, Bahner & Stophel

(57) ABSTRACT

An apparatus for controlling the movement of an animal using an integral collar and self-retracting leash apparatus. According to the invention, an elastomeric cord is attached to a strap, which is adapted to be secured around the neck of an animal. In the preferred embodiment of the invention, the strap encloses the fixed end of the elastomeric cord, which is attached to an anchor located near the first end of the strap. The cord extends from the anchor in a direction substantially parallel to the longitudinal axis of the strap and passes around about 180° of a pulley or spool located near the second end of the strap. The cord then extends from the pulley in a direction substantially parallel to the longitudinal axis of the strap to an opening located near the first end of the strap. The free end of the cord passes through the opening in the strap. A handle is attached to the free end of the cord to prevent the free end from retracting through the opening into the enclosed area of the strap and to allow the user to easily grasp the cord to control the movement of the animal.

5 Claims, 4 Drawing Sheets

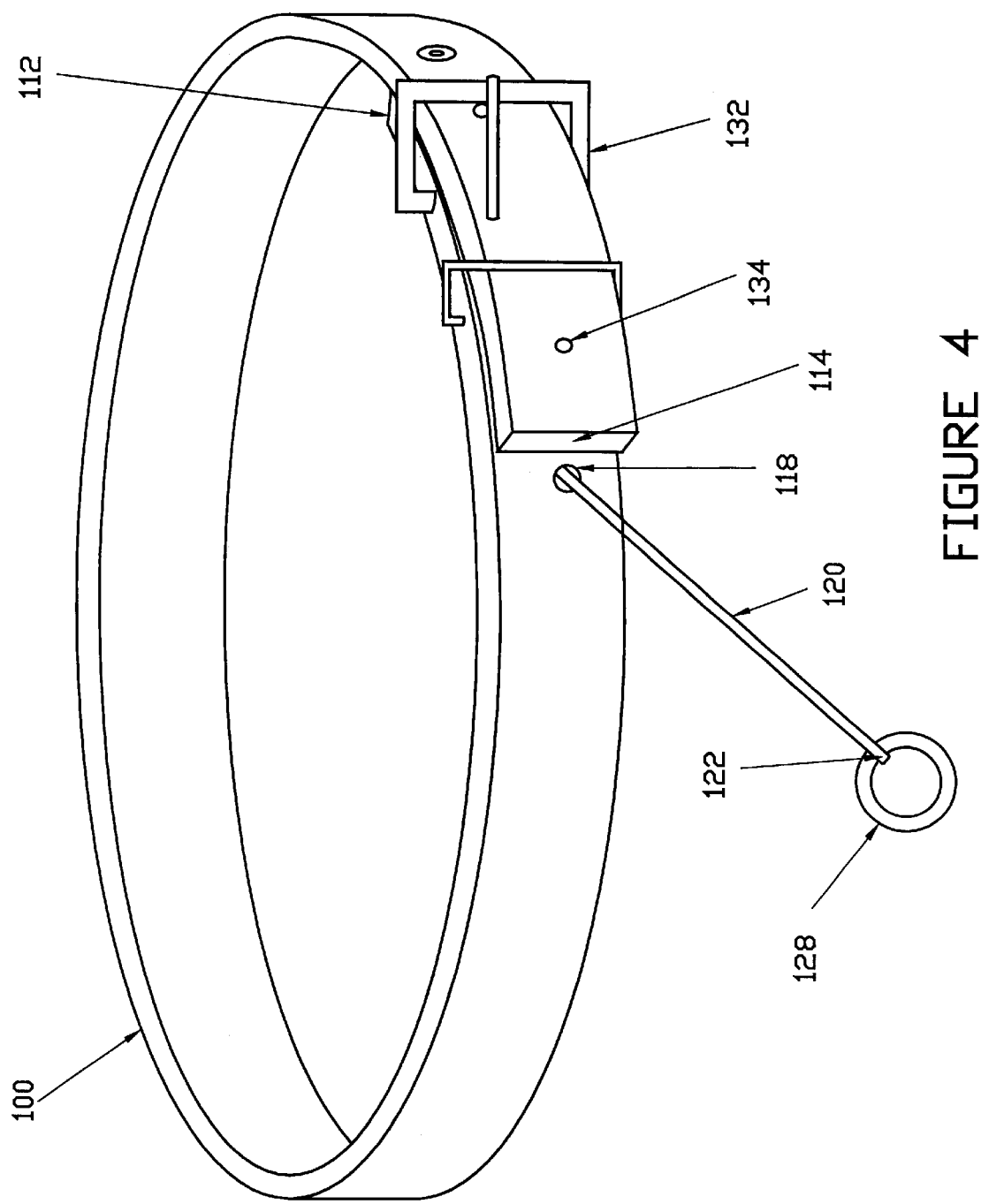

COLLAR WITH SELF-RETRACTING LEASH

FIELD OF THE INVENTION

This invention relates generally to collars with retractable leashes for use with animals, such as pet dogs. More particularly, the invention relates to an apparatus for controlling the movement of an animal through the use of an integrated collar and leash combination in which the leash is self-retracting, i.e. it retracts without the use of a mechanism, such as a spring-loaded spool or the like. In the preferred embodiment of the invention, the leash is made from an elastomeric material, such as the strapping or tie downs sold under the trademark BUNGEE.

BACKGROUND AND DESCRIPTION OF THE PRIOR ART

Many animal owners desire to control the movement of their animals in a variety of circumstances. Typically, two devices have been used to accomplish the controlled movement of animals; namely, the leash and the collar. Conventionally, the leash and collar have been utilized as separate devices which are capable of being removably attached to each other. Although the conventional leash and collar combination works well with many animals and in a number of circumstances, it may be inconvenient to use the separate devices in certain circumstances. For example, animal owners frequently do not desire to carry a separate leash with them. A separate leash requires that animal owners carry an additional object, thereby limiting their freedom of movement. In addition, a separately carried leash is subject to being lost or misplaced. In the absence of a leash, however, animal owners are required to bend over and grasp directly onto the animal's collar in order to control the animal. Except in the case of very large animals, animal owners may suffer from discomfort resulting from their bending over and grasping directly onto the animal's collar for any significant period of time.

Various devices have been developed to deal with the problems created by using a separate collar and leash to control the movement of animals. These devices generally involve the combination of the leash and collar into an integral, retractable assembly. See, e.g. U.S. Pat. Nos. 2,799,245; 3,250,253; 4,328,767;.4,964,370; 5,816,198. Thus, it is known that collars with retractable leashes are used to assist animal owners in controlling the movement of their animals. Typically, such collars are equipped with spring-loaded mechanisms to effect the retraction of a full-length (longer than 30") leash. These spring-loaded, full-length leash assemblies, however, suffer from several disadvantages.

First, spring-loaded assemblies are bulky and cumbersome, which causes discomfort to the animal wearing the assembly. Second, spring-loaded assemblies contain several moving parts, each of which is subject to damage due to misuse or wear and tear. Therefore, the lifespan of the spring-loaded assembly may be cut short or maintenance may be required as a result of the multiplicity of moving parts. Finally, the spring-loaded assemblies are complex and expensive to manufacture.

In addition, animal owners do not always require the use of a full-length leash. Under certain circumstances, such as retrieving a disobedient animal or showing a pet, a full-length leash is of no advantage. In fact, a shorter leash is more desirable in these situations inasmuch as it provides the user with a greater de e of control over the animal, and it is less likely to become entangled on itself or foreign objects, such as fences, hedges, and the animal's legs.

It would be desirable, therefore, if an apparatus for controlling the movement of an animal could be provided that eliminates the need for an animal owner to carry a separate leash and minimizes the discomfort the animal owner ordinarily experiences when attempting to control an animal without a leash. It would also be desirable if the apparatus for controlling an animal could be provided with a short, retractable leash to increase the animal owner's control over the movement of the animal and reduce the likelihood that the leash will become entangled on itself or foreign objects, including the animal's legs. It would also be desirable if an apparatus could be provided that does not require a spring-loaded mechanism to effect the retraction of the leash. It would also be desirable if such an apparatus could be provided that is less bulky and cumbersome than existing spring-loaded assemblies and more comfortable for the animal. It would also be desirable if such an apparatus could be provided that does not utilize a multiplicity of moving parts. It would also be desirable if such an apparatus could be provided that is less complex and less expensive to manufacture.

ADVANTAGES OF THE INVENTION

Accordingly, it is an advantage of the invention claimed herein to provide an apparatus for controlling an animal that eliminates the need for the user to carry a separate leash and minimizes the discomfort ordinarily experienced by the animal owner when attempting to control an animal without a leash. It is another advantage of the invention to provide an apparatus for controlling animals with a short, retractable leash to increase the pet owner's control over the movement of the animal and reduce the likelihood that the leash will become entangled on itself or foreign objects, including the animal's legs. It is yet another advantage of the invention to provide an apparatus to control an animal with a retractable leash that does not require a spring-loaded mechanism to effect the retraction of the leash. It is a further advantage of the invention to provide an apparatus that is less bulky and cumbersome than existing spring-loaded assemblies. It is another advantage of the invention to provide an apparatus that does not utilize a multiplicity of moving parts and is less complex and expensive to manufacture than existing assemblies.

Additional advantages of this invention will become apparent from an examination of the drawings and the ensuing description.

EXPLANATION OF TECHNICAL TERMS

As used herein, the term self-retracting leash refers to any type of leash the length of which may be extended and retracted without the assistance of a mechanism such as a spring-loaded assembly. The term includes, but is not limited to, leashes made from elastomeric materials, such as the strapping or tie downs sold under the trademark BUNGEE, which is registered to the Original Bungee Company.

As used herein, the term substantially parallel refers to a condition in which a first line (or direction) is oriented with respect to a second line (or a longitudinal axis) at an angle within about ±30° of parallel.

SUMMARY OF THE INVENTION

The invention comprises a collar with a self-retracting leash for controlling the movement of animals, such as pet dogs. According to the invention, the apparatus comprises a strap having a first end and a second end. The first end and the second end of the strap are adapted to be removably attached together. An elastomeric cord having a fixed end and a free end is attached to the strap at the fixed end of the elastomeric cord. A retainer, such as an opening or a half-ring, is provided on the strap at a point spaced from the fixed end of the elastomeric cord. The retainer is adapted to permit the elastomeric cord to extend and retract through it.

In a preferred embodiment of the invention, the strap has a longitudinal axis. An anchor is attached to the strap, and the fixed end of the leash is attached to the anchor. A pulley is also attached to the strap and spaced from the anchor so as to permit the elastomeric cord to extend from the anchor to the pulley in a direction substantially parallel to the longitudinal axis of the strap. The elastomeric cord then passes around about 180° of the pulley and continues in a direction substantially parallel to the longitudinal axis of the strap. A retainer is provided on the strap and is spaced a distance from the pulley so as to permit the elastomeric cord to extend from the pulley to the retainer in a direction substantially parallel to the longitudinal axis of the strap.

In another preferred embodiment of the invention, the strap encloses the anchor, the pulley, the fixed end of the elastomeric cord and the length of cord extending from the anchor, around the pulley, and to an opening in the strap. The opening and the anchor are located near the first end of the strap. The pulley is located near the second end of the strap. A handle is attached to the free end of the elastomeric cord to prevent the free end of the cord from retracting through the opening into the enclosed area of the strap. The handle also provides an easily accessible means for the user to grasp the elastomeric cord.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 4 is an illustration of the embodiment of FIG. 3 showing the strap enclosing the interior components of such embodiment of the invention.

DESCRIPTION OF THE PREFERRED EMBODIMENTS OF THE INVENTION

Figure 1:
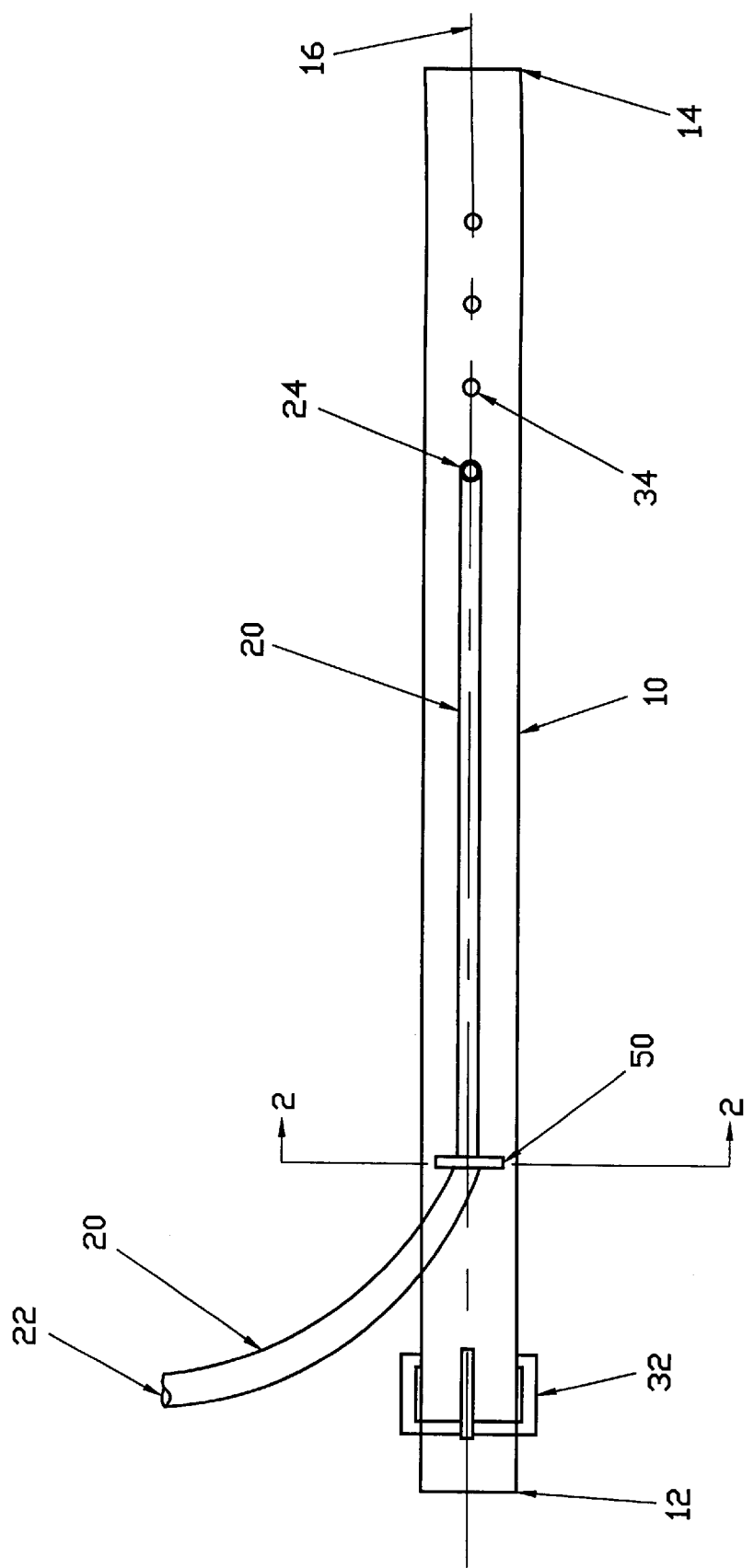
FIG. 1 is an illustration of a preferred embodiment of the invention.
Figure 2:
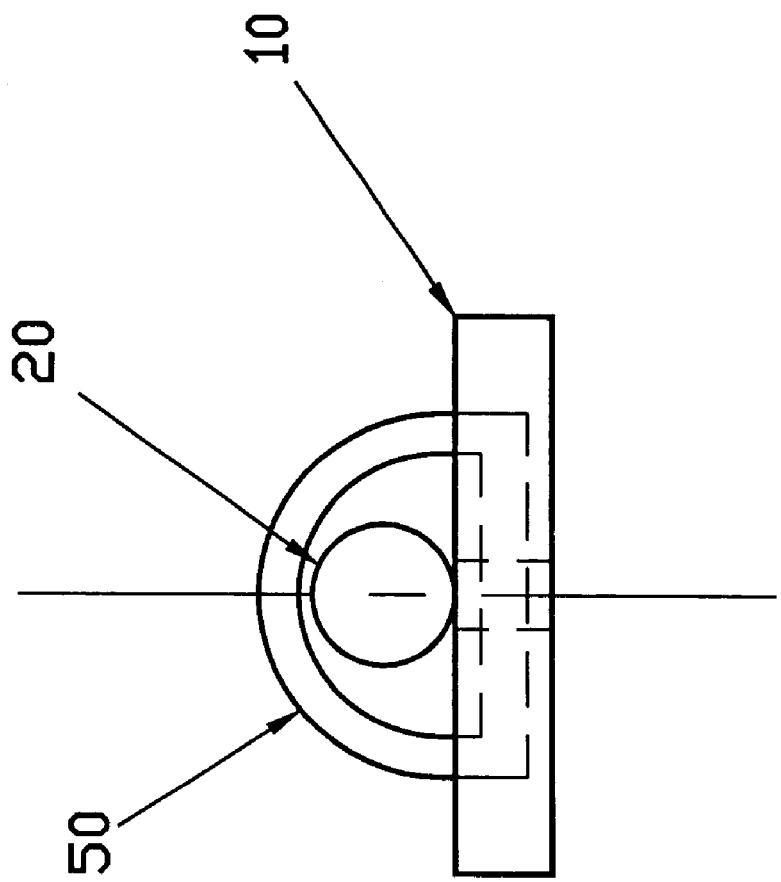
FIG. 2 is an sectional view illustration of the embodiment of FIG. 1 taken along the line 2—2.
Figure 3:
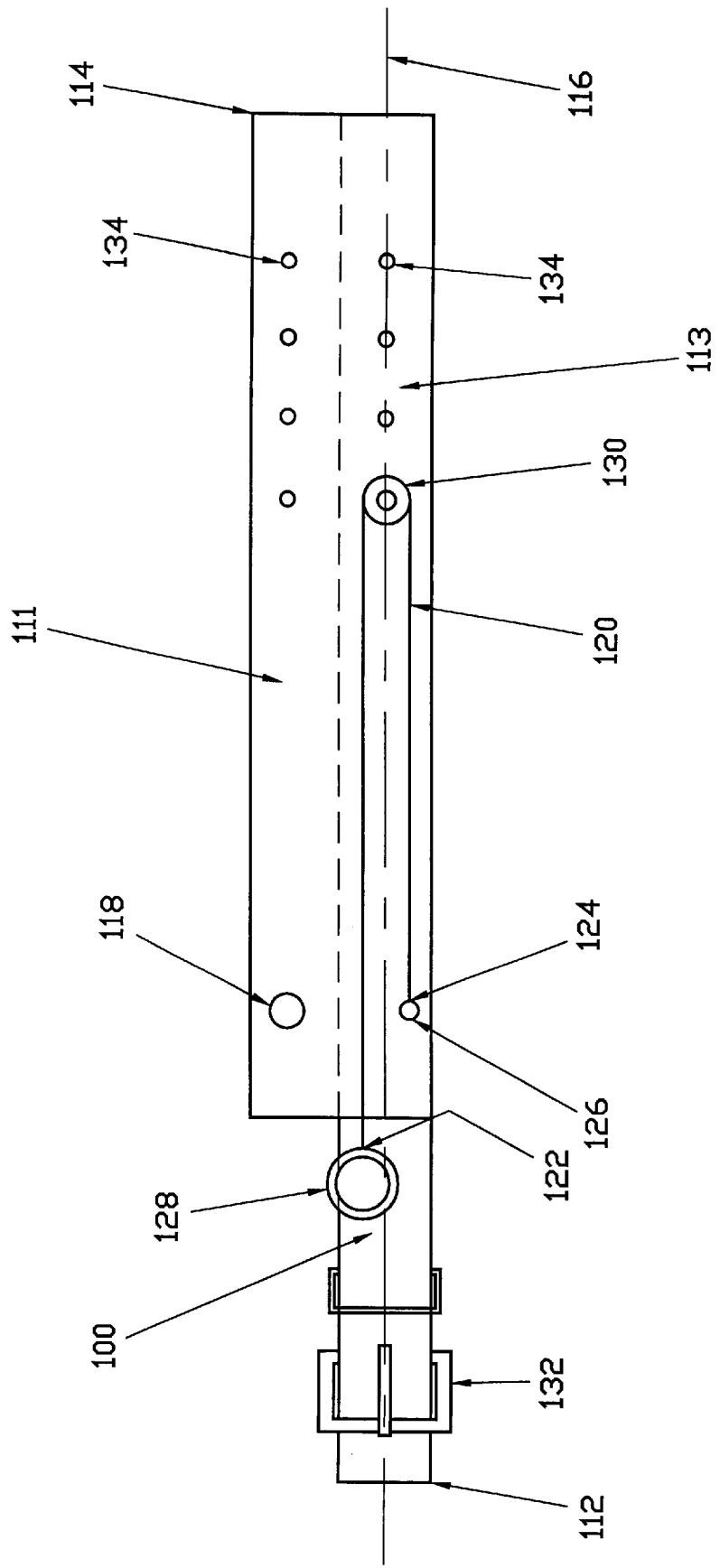
FIG. 3 is an illustration of an alternative embodiment of the invention showing the interior components of this embodiment of the invention.

Referring now to the drawings, the invention is illustrated by FIGS. 1–3. FIG. 1 illustrates a preferred embodiment of the invention which is intended for use in controlling the movement of an animal, such as a pet dog. As shown in FIG. 1, the invention comprises strap 10 and elastomeric cord 20, which together form an integral assembly. Strap 10 is adapted to be removably secured around the neck of an animal which the user seeks to control. Strap 10 may be made from any suitable material conventionally used to make animal collars. In a preferred embodiment of the invention, the strap is made from a material which is capable of enclosing the self-retracting leash assembly, such as nylon, leather or the like. Strap 10 has a first end 12, a second end 14, and a longitudinal axis 16. First end 12 and second end 14 are provided with conventional means for being removably attached together, such as buckle 32 and holes 34, hook and loop type fasteners (not shown), or a plastic coupling assembly commonly used with nylon straps (also not shown). Other conventional means for removably attaching first end 12 and second end 14 may be used.

Elastomeric cord 20 is adapted to be used as a short, self-retracting leash for controlling the movement of an animal. Cord 20 is composed of an elastomeric material which is capable of retracting without the assistance of a mechanism such as a spring-loaded spool or the like. A variety of elastomeric materials, such as the strapping or tie downs sold under the trademark BUNGEE, may be used to make cord 20. Cord 20 has a free end 22 and a fixed end 24. Fixed end 24 is attached to strap 12 using any suitable conventional fastening means, such as a rivet, a threaded fastener, glue or the like. In addition, the fixed end may be sewn to the strap. In this embodiment, cord 20 is not enclosed by strap 10.

A retainer, such as half-ring 50 or opening 18 (See FIG. 2), is provided on strap 10. Half-ring 50 is located at a point spaced from the fixed end 24 of elastomeric cord 20. Half-ring 50 is adapted to permit elastomeric cord 20 to extend and retract through it. In a preferred embodiment of the invention, the distance between the fixed end 24 of cord 20 and half-ring 50 is at least about 90% of the length of cord 20 in a retracted condition, i.e. when no external pulling force is applied to the cord.

As illustrated in FIG. 2, half-ring 50 may be attached to the surface of or embedded within strap 10 using any suitable conventional fastening means, such as glue, staples, sewn thread and the like.

FIGS. 3 and 4 illustrate a preferred embodiment of the invention in which a portion of the cord is enclosed by the strap. In this embodiment, strap 110 includes an upper flap 111 that folds over and encloses a portion of cord 120 and is secured to base 113. As shown in FIG. 3, fixed end 124 of cord 120 is attached to anchor 126 using any suitable conventional fastening means. Fixed end 124 may also be tied around anchor 126. It is also contemplated that fixed end 124 may be attached directly to strap 100 in a manner similar to that by which fixed end 24 of cord 20 is attached to strap 10, using any suitable conventional fastening means, such as a threaded fastener, a rivet, glue or the like. Anchor 126 may be composed of any suitable solid material, such as metal or plastic. Anchor 126 is attached to strap 100 using any suitable fastening means, such as a rivet or a threaded fastener. It is also contemplated that anchor 126 may be a rivet, a threaded fastener or the like.

Pulley 130 is attached to strap 100 using any suitable conventional fastening means, such as a rivet or a threaded fastener. Pulley 130 is adapted to allow cord 120 to extend and retract about it. Pulley 130 is preferably rotatably attached to strap 110 so as to rotate about an axis substantially perpendicular to longitudinal axis 116, but it may also be fixedly attached thereto (not shown). In a preferred embodiment of the invention, pulley 130 allows cord 120 to freely extend and retract around it by rotating with the movement of cord 120. Cord 120 may also freely extend and retract around a fixed pulley by utilizing materials for the cord and the pulley which do not create frictional forces sufficient to prevent the extension and retraction of cord 120. An example of such materials is a conventional strapping or tie down like those sold under the trademark BUNGEE and a smooth metal or hard plastic pulley. Pulley 130 is spaced from anchor 126 such that cord 120 extends from the anchor to the pulley in a direction substantially parallel to longitudinal axis 116. Cord 120 passes around about 180° of pulley 130 and extends therefrom to opening 118 in flap 111 in a direction substantially parallel to longitudinal axis 116. Opening 118 is adapted to permit elastomeric cord 20 to freely pass through flap 111 of strap 110.

As illustrated in FIG. 3, in a preferred embodiment of the invention, anchor 126 and opening 118 are located near first end 112 of strap 110. Pulley 130 is attached to strap 110 near second end 114. Handle 128 is attached to the free end of cord 120 by any suitable conventional fastening means. It is also contemplated that handle 128 may be an integral part of cord 120. Handle 128 is configured so as to allow cord 120 to be easily grasped by the user and to prevent free end 122 of cord 120 from retracting through opening 118. In a preferred embodiment, handle 128 is generally shaped in the form of a loop, but shapes such as a "T", a hook, a knob, and others are also contemplated within the scope of the invention.

As illustrated in FIGS. 3 and 4, in a preferred embodiment of the invention, strap 110 is adapted to enclose substantially all of the self-retracting leash assembly. As shown in FIG. 3, when cord 120 is in a retracted condition, i.e. no external pulling force is exerted on it, strap 110 encloses anchor 126, fixed end 124, pulley 130 and substantially all of cord 120 in its retracted condition. Thus, when cord 120 is in a retracted condition, only handle 128 is on the exterior of opening 118. When an external pulling force is applied to cord 120, a portion of cord 120 will also extend through opening 118 as the length of the cord increases proportionally with the amount of external force exerted thereon (See FIG. 4). Consequently, in the preferred embodiment of the invention, strap 110 encloses substantially the entire self-retracting leash assembly (excepting handle 128) when cord 120 is in a retracted condition so as to reduce the risk of damage to the self-retracting leash assembly and reduce the risk of the assembly becoming entangled on itself or foreign objects, including the animal's legs.

In a preferred embodiment of the invention, the distance between the fixed end 124 of the cord 120 and pulley 130 is at least about 45% of the length of the cord in a retracted condition, i.e. when no external force is applied to the cord. In another preferred embodiment of the invention, the distance from the fixed end 124 of cord 120 to pulley 130 and back to opening 118 is at least about 90% of the length of the cord in a retracted condition, i.e. when no external force is applied to the cord.

An example of one embodiment of the invention comprises a nylon strap with a length of 27 inches and a width of 1.75 inches. The elastomeric cord is a conventional strapping or tie down like those sold under the trademark BUNGEE. The cord is 30 inches in length and (5/32) of an inch in diameter in a retracted condition. A fixed pulley is located at a distance of 6 inches from the first end of the strap. The fixed end of the cord is stapled and glued at a distance of 14 inches from the pulley, and a retainer opening is located at a distance of 14 inches from the pulley. This particular embodiment is appropriate for use with a pet dog having a neck circumference of between 18.5 and 24.5 inches and a shoulder height of approximately 12 inches or more.

In operation, the strap is secured around the neck of an animal by connecting the first end and the second end of the strap using the conventional means for removable attachment. In its retracted state, the elastomeric cord is substantially enclosed by the strap with only the handle attached to the free end of the cord extending through the opening. When the user wishes to control the movement of the animal, the handle provides a simple device for easily grasping the cord. When the user grasps the handle and exerts a pulling force on it, the length of the elastomeric cord will increase as it passes through the opening of the strap in the direction of the pulling force. The user may then control the movement of the animal without grasping directly onto the strap. As a result, the user may assume a more comfortable position while controlling the animal with the elastomeric cord. When the user no longer wishes to control the movement of the animal, he or she simply releases the handle, and the cord retracts back into the strap. The handle prevents the free end of the elastomeric cord from retracting back into the enclosed area of the strap through the opening.

Several advantages are realized in the operation of the invention. First, the operation of the apparatus does not employ a plurality of moving parts which create a bulky and cumbersome apparatus, increase the cost of production, and are susceptible to damage. In addition, the apparatus eliminates the need for the user to carry a separate leash and maximizes the user's control over the movement of the animal under certain circumstances by providing a shorter cord. Further, the invention reduces the discomfort experienced by the animal wearing the apparatus and by the user attempting to control the movement of the animal. Finally, the shorter self-retracting cord minimizes the possibility that it will become entangled on itself or foreign objects, including the animal's legs.

What is claimed is:

1. A collar with a self-retracting leash, comprising:
   (a) a strap having a longitudinal axis, a first end and a second end, said first end and said second end being adapted to be removably attached together;
   (b) an elastomeric cord having a fixed end and a free end, said fixed end being attached to said strap by an anchor;
   (c) a pulley that is attached to the strap and spaced from the anchor so as to permit the elastomeric cord to extend from the anchor in a direction substantially parallel to the longitudinal axis of the strap and pass around about 180° of the pulley; and,
   (d) a retainer that is provided on said strap at a point spaced from the fixed end of the elastomeric cord and is spaced a distance from the pulley so as to permit the elastomeric cord to extend from the pulley to the retainer in a direction substantially parallel to the longitudinal axis of the strap, said retainer being adapted to permit the free end of the elastomeric cord to extend and retract through it;
   wherein the strap encloses the anchor, the pulley, and substantially all of the elastomeric cord when the elastomeric cord is in a retracted condition.

2. The collar of claim 1, which includes a handle attached to the free end of the elastomeric cord.

3. The collar of claim 1, wherein the distance between the fixed end of the elastomeric cord and the pulley is at least about 45% of the length of the elastomeric cord in a retracted condition.

4. The collar of claim 1, wherein the distance between the fixed end of the elastomeric cord to and around the pulley and back to the retainer is at least about 90% of the length of the elastomeric cord in a retracted condition.

5. The collar of claim 1, wherein the retainer comprises an opening in the strap.

* * * * *